(12) United States Patent
Zhang et al.

(10) Patent No.: US 8,503,777 B2
(45) Date of Patent: Aug. 6, 2013

(54) GEOMETRIC FEATURE BASED IMAGE DESCRIPTION AND FAST IMAGE RETRIEVAL

(75) Inventors: Ximin Zhang, San Jose, CA (US); Ming-Chang Liu, San Jose, CA (US)

(73) Assignee: Sony Corporation, Tokyo (JP)

(*) Notice: Subject to any disclaimer, the term of this patent is extended or adjusted under 35 U.S.C. 154(b) by 173 days.

(21) Appl. No.: 12/970,806

(22) Filed: Dec. 16, 2010

(65) Prior Publication Data
US 2012/0155752 A1 Jun. 21, 2012

(51) Int. Cl.
*G06K 9/00* (2006.01)
*G06K 9/60* (2006.01)

(52) U.S. Cl.
USPC ......................................... 382/168; 382/305

(58) Field of Classification Search
None
See application file for complete search history.

(56) References Cited

U.S. PATENT DOCUMENTS

| | | | |
|---|---|---|---|
| 5,278,921 A * | 1/1994 | Nakamura et al. | 382/167 |
| 6,404,920 B1 | 6/2002 | Hsu | |
| 7,006,714 B2 | 2/2006 | Kasutani | |
| 7,062,083 B2 | 6/2006 | Lim et al. | |
| 7,453,468 B2 * | 11/2008 | Ziobro | 345/596 |
| 8,249,342 B1 * | 8/2012 | Friedhoff et al. | 382/167 |
| 8,335,383 B1 * | 12/2012 | Cosoi | 382/224 |
| 2002/0080379 A1 * | 6/2002 | Iwaki | 358/1.13 |
| 2003/0048950 A1 * | 3/2003 | Savakis et al. | 382/225 |
| 2005/0157924 A1 * | 7/2005 | Kato | 382/170 |
| 2006/0133668 A1 * | 6/2006 | Kita et al. | 382/162 |
| 2007/0031059 A1 * | 2/2007 | Achong et al. | 382/274 |
| 2007/0201743 A1 * | 8/2007 | Ferman | 382/168 |
| 2008/0037897 A1 * | 2/2008 | Chiang et al. | 382/273 |
| 2008/0177764 A1 * | 7/2008 | Kise et al. | 707/100 |
| 2012/0201450 A1 * | 8/2012 | Bryant et al. | 382/162 |

OTHER PUBLICATIONS

Das, M., Riseman, E.M., and Draper, B.A. Focus: Searching for Multi-colored Objects in a Diverse Image Database, 1997, 1997 IEEE Computer Society Conference on Computer Vision and Pattern Recognition, pp. 756-761.*
Park, D.K., Jeon, Y.S., Won, C.S., Park, S.J., and Yoo, S.J., A Composite Histogram for Image Retrieval, 2000, 2000 IEEE International Conference on Multimedia and Expo, vol. 1, pp. 355-358.*
Tico, M., Harverinen, T., and Kuosmanen, P., A Method of Color Histogram Creation for Image Retrieval, 2000, In Proceedings of Nordic Signal Processing Symposium (NORSIG), pp. 157-160.*
Smith, J.R., and Chang, S.F., VisualSEEk: a fully automated content-based image query system, 1996, In Proceedings of the Fourth ACM International Conference on Multimedia, pp. 87-98.*

(Continued)

*Primary Examiner* — Stephen R Koziol
*Assistant Examiner* — Jonathan S Lee
(74) *Attorney, Agent, or Firm* — John P. O'Banion

(57) ABSTRACT

An apparatus and method for processing pictures (images, graphics or video frames) for image representation and comparison on the basis of a geometric feature description built from histograms of pseudo-color saturation. The feature description can also include normalized centroid variance, as well as an intensity map. The descriptions allow various matching comparisons to be performed between an input image and a set of comparison images, such as to find matching (or mismatching, or other relationship) images. The comparison can be sped using staged comparisons, whereby an image failing one level of comparison need not be considered in subsequent phases. A set of efficient image feature descriptors are described for use in a fast image retrieval scheme, which is efficient for searching of images spanning different image types, rotations and scales.

14 Claims, 5 Drawing Sheets

OTHER PUBLICATIONS

Zhu, J., Bede, L., and Schwartz, S.C., General Illumination Correction and its Application to Face Normalization, Apr. 6-10, 2003, vol. 3, pp. III-133-III-136.*

Tao, Y., and Grosky, W.I., Spatial Color Indexing: A Novel Approach for Content-Based Image Retrieval, 1999, IEEE International Conference on Multimedia Computing and Systems, vol. 1, pp. 530-535.*

Deshmukh, V.M. et al.—"Retrieval by Color Features in Image Databases"—Int. Jour. of Computer Applications, vol. 1, No. 26, 2010, pp. 140-142.

* cited by examiner

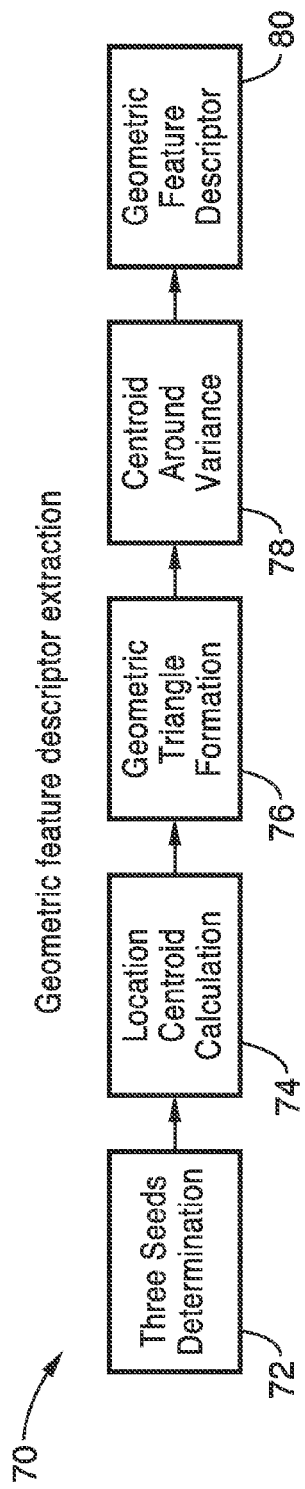
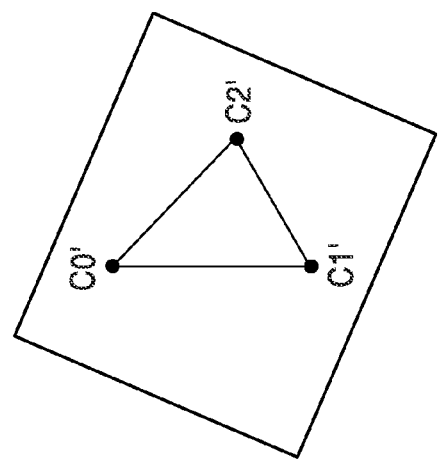
FIG. 6
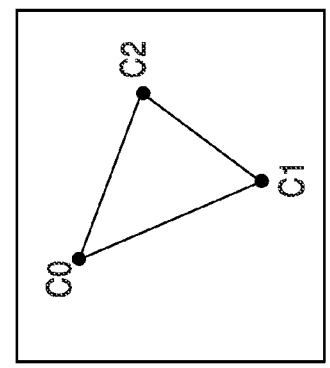
FIG. 5

GEOMETRIC FEATURE BASED IMAGE DESCRIPTION AND FAST IMAGE RETRIEVAL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image processing and retrieval, and more particularly to a fast image retrieval mechanism based on color geometric features.

2. Description of Related Art

Numerous applications in image processing require the identification of an image of interest. For instance, a consumer may provide an example image for which an application executing on a computer is to automatically find visually similar images in the database or internet. Therefore, various research fields related to content based image retrieval have been very active in recent years.

Progress has been made in regard to the above for select image types, such as facial or vehicular recognition, or other select fields. Yet, none of the mechanisms known provide for fast recognition on arbitrary images, which are not directed to a specific type of image to which the computer application is directed.

Accordingly, it is an object of the present invention to provide a fast image retrieval mechanism which utilizes image descriptions based on color geometric features.

BRIEF SUMMARY OF THE INVENTION

Apparatus and methods are described for processing images, (e.g., still images, or frames of video) by representing an image with pseudo color saturation map and intensity map, to allow similar images to be retrieved quickly based on map matching. Images are found from within a broad image domain according to the invention in response to matching of a template image. A set of efficient image feature descriptors have been developed including pseudo-color saturation based geometric feature and block intensity based geometric feature. By effectively integrating these features with image histograms, an effective image retrieval scheme is developed. It is efficient for image rotation and scale change and can be applied to the real time online applications which cannot use some high complexity methods such as SIFT based methods.

One embodiment of the invention is an apparatus for image retrieval, comprising: (a) a computer configured for processing images; (b) a memory coupled to the computer; and (c) programming configured for retention on the memory and executable on the computer for, (c)(i) maintaining a repository of images in an image repository, (c)(ii) determining a color feature as a pseudo-color saturation for an input image, (c)(iii) generating a histogram of the pseudo-color saturation, (c)(iv) comparing the histogram of pseudo-color saturation for the input image to a histogram of pseudo-color saturation for an image within the repository of images, and (c)(v) retrieving images from the repository of images in response to the comparing.

In one embodiment, the programming further comprises comparing a geometric feature description of the pseudo-color saturation. In one embodiment, the geometric feature description of the pseudo-color saturation and block intensity is calculated for a given block size by the programming by: (a) determining seed values from within the histogram of pseudo-color saturation and determining a similarity threshold for each seed; (b) determining a location centroid of the blocks in the same category as the seed; and (c) building a geometric figure from the location centroids for each seed as a geometric feature description of the pseudo-color saturation. In at least one implementation, seed values within the histogram of pseudo-color saturation comprise peak, cliff, and fall points.

In one embodiment, the programming further comprises comparing a block intensity map of the input image with the template. In one embodiment, the programming further comprises low pass filtering of an image prior to the generating of a histogram of pseudo-color saturation. In one embodiment, the programming further comprises scaling of an image to a lower resolution prior to the generating of a histogram of pseudo-color saturation. In one embodiment, the histogram of the pseudo-color saturation is contained within an image descriptor. In one embodiment, the programming further comprises differentiating between images in response to block intensity based geometric feature descriptions.

In one embodiment, image retrieval is performed for arbitrary images in which no information is needed in describing the subject matter of the image. In one embodiment, the image is selected from the group of images consisting of still images, graphics, and frames of video. In one embodiment, image retrieval is not adversely impacted by image scaling or rotation. In one embodiment, the image retrieval apparatus can be selected for retrieving matching images, non-matching images, or images having any desired relationship to one another. In one embodiment, the programming further comprises differentiating between images in response to: (a) determining an intensity feature as a block intensity for an input image; (b) generating a histogram of the block intensity; and (c) comparing a block intensity map of the input image with a template.

One embodiment of the invention is an apparatus for image retrieval, comprising: (a) a computer configured for processing images; (b) a memory coupled to the computer; and (c) programming configured for retention on the memory and executable on the computer for, (c)(i) maintaining a repository of images in an image repository, (c)(ii) determining a color feature as a pseudo-color saturation for an input image, (c)(iii) generating a histogram of the pseudo-color saturation, (c)(iv) determining seed values from within the histogram of pseudo-color saturation and determining a similarity threshold for each seed, (c)(v) determining a location centroid of the blocks in the same category as the seed, (c)(vi) building a geometric feature description from the location centroids for each seed as a geometric feature of the pseudo-color saturation, (c)(vii) comparing the feature description for the input image to a feature description from the centroids for each seed for an image within the repository of images, and (c)(viii) retrieving images from the repository of images in response to the comparing.

One embodiment of the invention is a method of retrieving images in response to a comparison, the method comprising: (a) maintaining a repository of images in an image repository; (b) determining a color feature as a pseudo-color saturation for an input image; (c) determining an intensity feature as a block intensity for an input image; (d) generating a histogram of the pseudo-color saturation; (e) generating a histogram of the block intensity; (f) determining seed values from within the histogram of pseudo-color saturation and determining a similarity threshold for each seed; (g) determining seed values from within the histogram of block intensity and determining a similarity threshold for each seed; (h) determining a location centroid and normalized centroid variance for each seed; (i) building a geometric feature description from the location centroids and normalized centroid variance for each seed as a geometric feature description of the pseudo-color saturation; (j) building a geometric feature description from the location centroids and normalized centroid variance for each seed as a geometric feature description of the block intensity; (k) comparing the geometric feature description for the input image with a geometric feature description from the location centroids for each seed for a comparison image within the repository of images; (l) comparing block intensity map of the input image with the template, and (m) retrieving images from the repository of images in response to the comparing.

The present invention provides a number of beneficial aspects which can be implemented either separately or in any desired combination without departing from the present teachings.

An aspect of the invention is the ability to generate image descriptors for arbitrary images wherein the application does not need to have information about the kind of image being described, and does not need to be programmed for processing a specific form of image type.

Another aspect of the invention is the ability to generate descriptors and perform fast image retrieval based on those descriptors for any general form of image, including still images, graphics, and frames of video.

Another aspect of the invention is the generation and comparison of image descriptors in response to pseudo-color saturation based geometric feature and block intensity features.

Another aspect of the invention is the generation of descriptors on the basis of histograms of pseudo-color saturation.

Another aspect of the invention provides image retrieval comparisons which are not adversely impacted by image scaling or rotation.

Another aspect of the invention is the ability to readily retrieve matching images, non-matching images, images having disparate features, or images having any desired relationship to one another in response to using feature extraction according to the present invention.

Another aspect of the invention is the use of descriptors utilizing one dimensional color features which are referred to herein as "pseudo-color saturation".

Another aspect of the invention is the quantizing of the extracted one-dimensional pseudo-color saturation map.

Another aspect of the invention is the generation of a color geometric seed value in response to a histogram of the quantized pseudo-color saturation map.

Another aspect of the invention is the finding of peak values in the histogram of the quantized pseudo-color saturation map.

Another aspect of the invention is a geometric seed selection which uses a plurality of seeds, for example three or more seeds.

Another aspect of the invention is the building of multi-location centroids to represent each seed.

Another aspect of the invention is differentiating between images in response to block intensity based geometric feature descriptions.

A still further aspect of the invention is representing any image with a combination of saturation map and intensity map.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 4 is a flow diagram of geometric feature description extraction according to an embodiment of the present invention.

FIG. 5 is a geometric figure, exemplifying a triangle of centroid locations used according to an embodiment of the present invention.

FIG. 6 is a geometric figure, exemplifying a similar triangle as in FIG. 5, yet having a different scale and rotation, according to an embodiment of the present invention.

DETAILED DESCRIPTION OF THE INVENTION

In order to facilitate automatic image retrieval, an image has to be represented either by feature descriptors or mathematical models, which allow a computer to compare the similarities of two images efficiently. Since mathematic models also need feature descriptors as input, image feature descriptors are arguably the most important elements for image retrieval. Usually, the image features include color, texture and shape. Using existing systems, an efficient image feature descriptor can be obtained only when the target image has a limited and predictable variation in appearance, such as frontal view images of a human face, or side views of automobiles.

However, arbitrary images processed according to the present invention can create general image descriptors containing any desired subject matter, and do not require the well-defined features such as eyes, nose or mouth necessary when performing a facial recognition task (or other known subject application). The general image feature descriptor according to the present invention is not task specific, as it is a-priori unknown what images the user may be interested in. In particular, it is preferable that the descriptors be made sufficiently generic to allow processing of large numbers of image categories. While fast and highly accurate object detectors are currently available for some select categories, such as faces and cars, general image feature descriptors are not well known which provide proper image discernment across a broad image domain. The descriptors and fast retrieval provided by the present invention are applicable to any desired type of image, such as still images, graphics, frames of video and so forth. For the sake of simplicity, the term "image", or "picture" is used herein to denote any image type of at least two dimensions without limitation.

The present invention generates a set of efficient image feature descriptors which are used in response to pseudo-color saturation based geometric and block intensity features. By effectively integrating these features with image histograms, an effective image retrieval scheme has been developed. This innovative scheme is efficient for arbitrary images and images subject to rotation and scale changes while having the ability to support real time online applications which cannot use some high complexity methods, such as Scale Invariant Feature Transforms (SIFT) based methods.

1. Overall Description of the Method.

Figure 1:
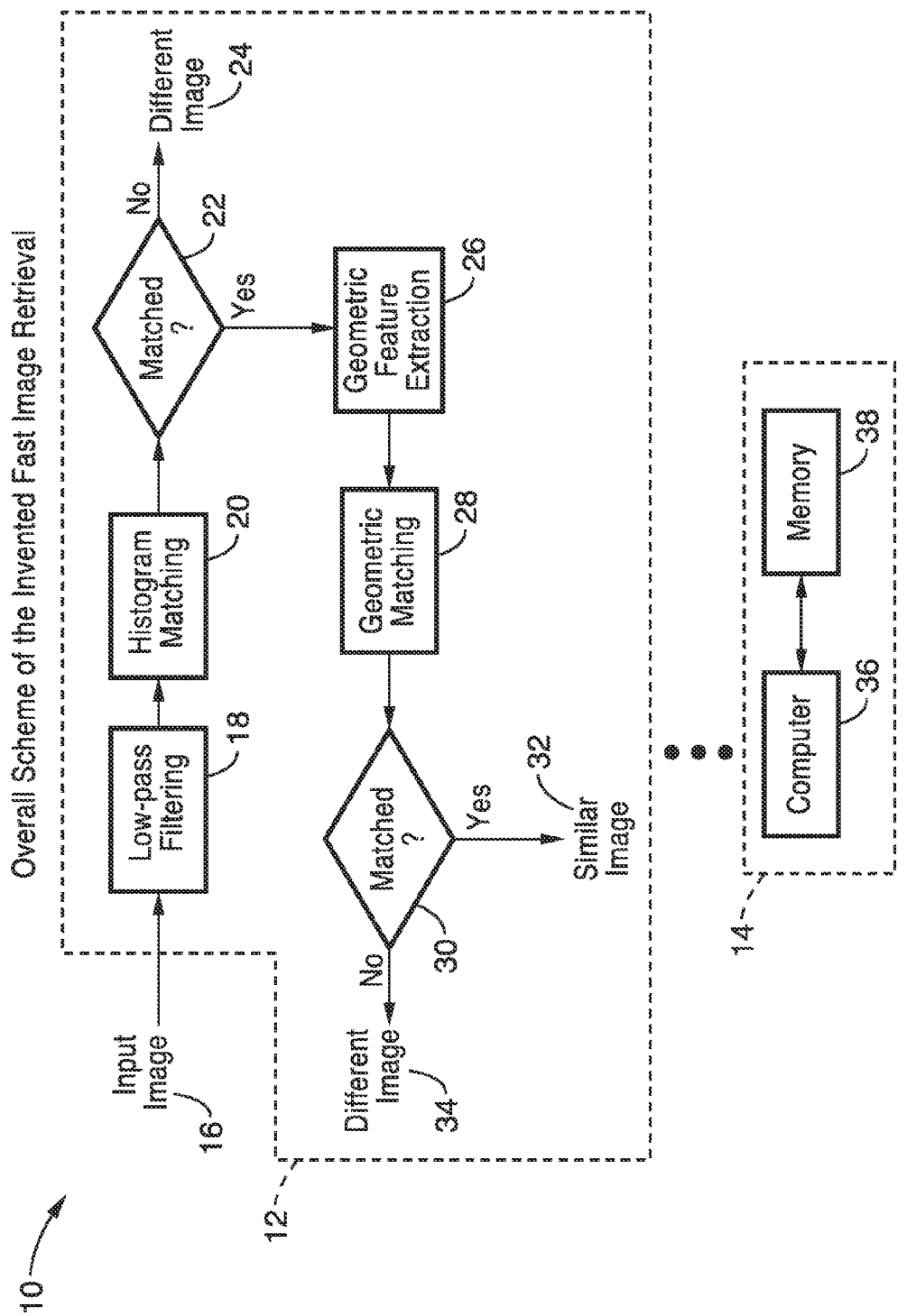
FIG. 1 is a flow diagram of fast image retrieval according to an embodiment of the present invention, and showing a computer processor and associated memory for carrying out executable programming.

FIG. 1 illustrates an example embodiment 10 showing the overall architecture of the developed apparatus and method, showing a programming sequence 12 executable on a processing element 14 for retrieving an image using the inventive descriptor mechanisms. An input image 16 is received and low pass filtered 18 to remove sub-feature noise. In addition, the image can be rescaled to a lower resolution within block 18, depending on the original size of the image and the retrieval application being performed. After that, an image histogram is determined 20 as follows:

$$Hist[v] = \frac{1}{MxN} \sum_{i=1}^{M} \sum_{j=1}^{N} \delta_v(i, j),$$

where $v = 0, 1, \ldots, V$ where M is the image height and N is the image width by number of pixels. Then $\delta_V(i, j)=1$ if the value at pixel location [i, j] is equal to v, while otherwise $\delta_V(i, j)=0$. The image histogram is then compared 22 to the histogram of a template image to find their distance. It will be appreciated that a template image is usually a user provided example image for retrieval purposes. Any effective histogram distance measure (D) can be used here. For instance, a simplified Chi square can be used as follows:

$$D(Hist_{current}, Hist_{template}) \sum_{v} \frac{|Hist_{current}[v] - Hist_{template}[v]|}{Hist_{current}[v] + Hist_{template}[v]}$$

where $Hist_{current}$ is the histogram of the current image and $Hist_{template}$ is the histogram of the template image. If the distance (D) is larger than a threshold, the current image is detected as not matched 24 to the template image, and the processing is completed. Otherwise, the current image is detected as matched in the first stage.

In a second stage of comparison within the example embodiment, a geometric feature is extracted 26 and compared. It will be appreciated that the invention can be implemented utilizing the combination of first and second stage as described, while alternate implementations can utilize either the first or second stage depending on the application, without departing from the inventive teachings herein. In this embodiment the geometric feature is based on the pseudo color saturation map and block intensity map. The definition of pseudo color saturation map and block intensity map will be described in the following sections. The use of a staged comparison speeds the comparison process, as subsequent computations need not be performed on those images which fail a prior comparison. It will be appreciated that each of the descriptor elements taught herein may be compared in stages to speed image retrieval.

After the geometric feature descriptor is obtained, a geometric matching step is performed 28 with a comparison to the geometric feature descriptor of the template image to find their distance. A comparison step 30 is performed to determine if the distance is less than a threshold, wherein the current image is detected as a visually similar image 32 as the template image. Otherwise, the current image is detected as being different 34 from the template image. The technical details of each module are described in the following sections.

A computer 36 and associated memory 38 are shown in a processing block 14 of FIG. 1 for carrying out programming for the retrieval steps, or alternatively for executing descriptor generations steps, or other operational steps described in other flowcharts and descriptions within the present application. It will be appreciated that the computer may comprise one or more local or distributed computer processing elements, without departing from the teachings of the present invention.

It should be appreciated, that although retrieval of similar matching images is described herein by way of example, the invention also provides the ability to find non-matching images, images having disparate (distinct or opposing) features, or images having any desired relationship to one another in response to feature extraction of the present invention. One or more patterns can be established according to the invention for comparing the geometric descriptors of a first image and images sought to be retrieved. For the sake of simplicity, a single image input is described, however, it will be appreciated that a descriptor can be created for a group of inputs, in response to processing each individually to arrive at a descriptor and then processing the descriptors into a group or processing the image collectively to directly arrive at a group descriptor; such as considering a group of frames from a segment of video. It should be appreciated, therefore, that the present invention is not limited as to specific number of images, relationships, color spaces, and so forth.

2. Geometric Feature Descriptor Based on Pseudo Color Saturation.

One of the important features that differentiates one image from another is the color. Many objects can be differentiated from their surroundings only in response to utilizing color information. The pseudo color saturation based geometric feature descriptor of the present invention is particularly well-suited for capitalizing on this observation.

It will be appreciated that many formats exist for storing color images. By way of example and not limitation, popular color systems (color space descriptions) include RGB (Red, Green, Blue), HSV (Hue, Saturation, Value) and YCbCr (Luminance, Chrominance$_B$, Chrominance$_R$, which is also referred to as YCC, or the similar YUV) and so forth. Since most of the compression and transmission standards are based on YCbCr format, the discussion herein discusses the YCbCr format, although the present invention is applicable to any desired color space or system. In addition, it will be understood that an ability to map from one color space to another is well established. Accordingly, any of these various color systems can be mapped into the YCbCr format described in the example implementations.

Theoretically, a true color can only be represented by a three-dimensional (3D) combination of YCbCr channels. In developing a low complexity method for image retrieval, a one-dimensional (1D) based method is desirable insofar as it is capable of suitably performing image retrieval. Testing performed on the inventive teachings have shown that the Cb and Cr difference in the YCbCr color space is well suited. It should be noted that a similar formulation can be created by mapping this relationship into other color systems by color space mapping. A one dimensional color feature which is referred to herein as "pseudo-color saturation" is extracted according to the following description which assumes by way of example and not limitation, a color system using 8-bits, although 16, 24, 32 and other number of bits per color dimension can be utilized by changing the thresholds, or scaling the color dimension values into an 8 bit color space.

$$Saturation_{pseudo-color} = \begin{cases} 0 & \text{if } S_1 < 0 \\ S_1 & \\ 255 & \text{if } S_1 > 255 \end{cases}$$

where $$S_1 = \begin{cases} 128 + 2*(C_b - C_r) & \text{if } C_r > 170 \\ 28 & \text{if } C_b < 128 \text{ and } C_r < C_b \\ 128 + (C_b - C_r) & \text{otherwise} \end{cases}$$

It should be appreciated that "pseudo-color saturation", as that term is used herein, does not indicate a real color saturation according to the standard definition; but instead is used herein to describe the above extracted feature. In the above equation, multiplication by 2 is used if $C_r > 170$, according to one implementation of the invention. This adjustment is used to cluster the very saturated color together. For instance, one red flower may have extreme red color in the middle and relative red color along the boundary. Human perception typically ignores this kind of shade difference and simply concludes the image is of a "red flower", for example.

A given block size (e.g., 4×4 in the described implementation) Cb mean and Cr mean are used to calculate the pseudo-color saturation value, although the system can be implemented with other block sizes and using other color systems as desired. After the pseudo-color saturation map is extracted, the saturation value is quantized by the following calculation:

(Saturation$_{pseudo-color}$+4)>>3

The histogram of the quantized pseudo-color saturation map is then calculated for color geometric seed selection. The basic idea is to find the appropriate peak value in the histogram with some adjustment such that the largest number of possible pseudo-color saturation values that belong to the object of interest can be extracted. By way of example and not limitation, the mechanism described herein selects three seeds for use.

2.1 Geometric Seed Selection.

Figure 2:
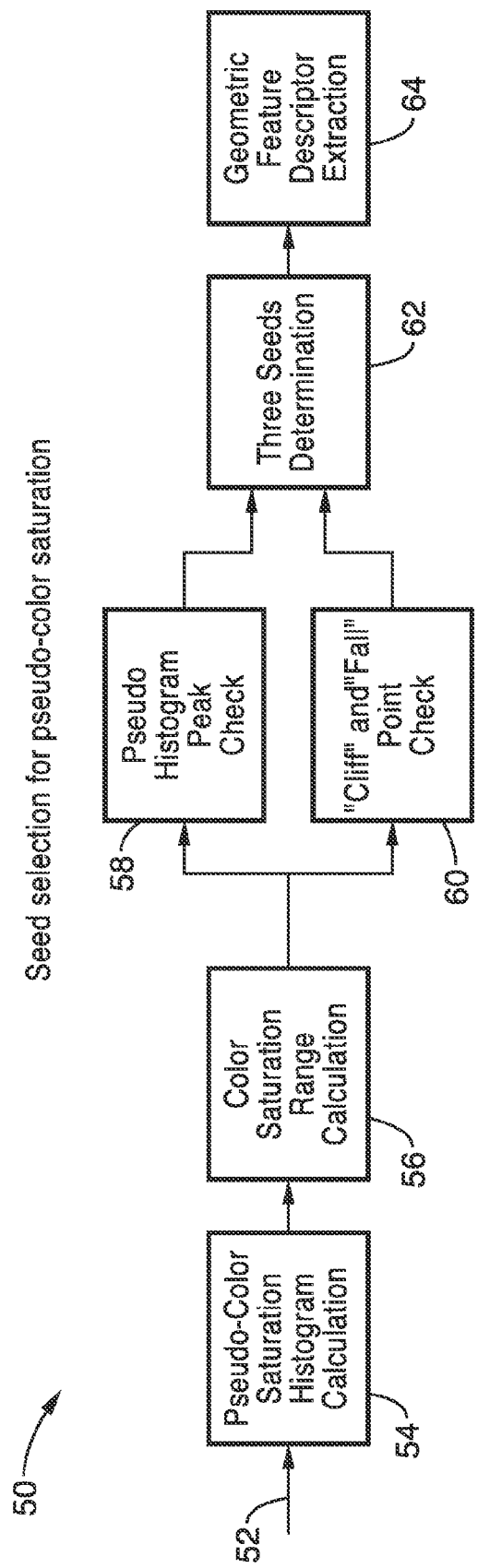
FIG. 2 is a flow diagram of seed selection for pseudo-color saturation according to an embodiment of the present invention.

FIG. 2 illustrates an example embodiment 50 of a seed selection procedure. A processor element is not shown in this figure for the sake of simplicity of illustration, although this and other flowcharts are preferably performed in response to programming executed on a processor as discussed for FIG. 1. A one dimensional color metric 52 is received and a histogram calculated 54 of the quantized pseudo-color saturation value. Before proceeding, it will be instructive to discuss an example histogram.

Figure 3:
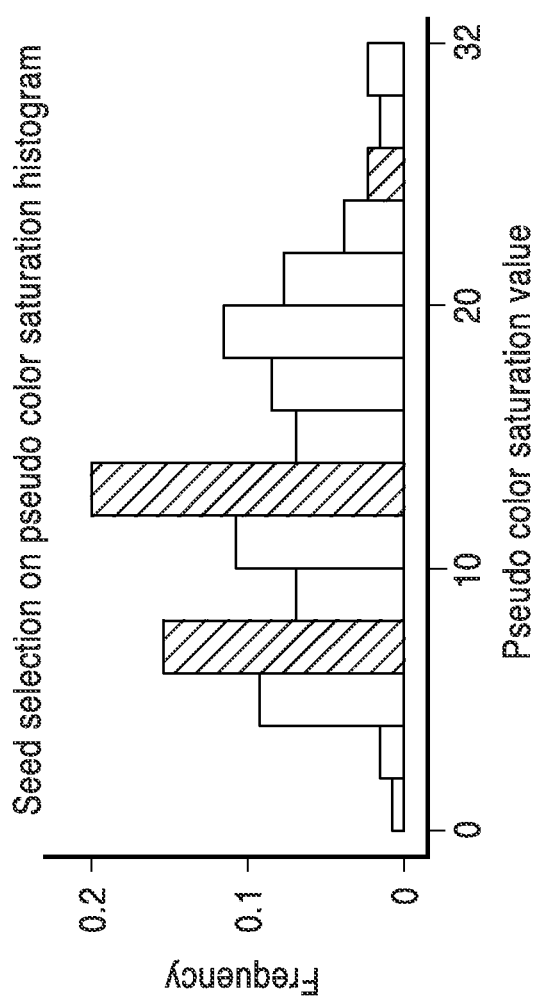
FIG. 3 is an histogram example used for seed selection according to an embodiment of the present invention.

FIG. 3 illustrates an example pseudo color saturation histogram used as the basis for seed selection according to the present invention, showing bins having diagonal hash marks which are selected as the seed bins as will be described below.

Returning to the discussion of FIG. 2, let Hist[v] denote the histogram value of the quantized pseudo-color saturation value v, the seed selection process is performed by the following set of steps:

Step (1)—Find Color Saturation Range 56. In the color saturation range calculation module, the color saturation lower bound is found by searching the minimum color saturation value "v0" with Hist[v0] greater than a threshold P and the color saturation upper bound is found by searching maximum color saturation value "vm" with Hist[vm] greater than a threshold P. It will be noted that P is an image size dependent parameter which has the value of six (6) in the example implementation, but is not limited thereto.

Step (2)—Checking Histogram Bins (58 and 60). After the color saturation range is determined, the histogram bins are checked to determine if their value is greater than a value K (which is 16, by way of example and not limitation). The following criteria were used to find all the candidate histogram bins as potential seeds:

(2)(a) Pseudo Histogram Peak Check 58.
if Hist[v]≧Hist[v+1] and Hist[v]>Hist[v−1]
if Hist[v]≧Hist[v−1] and Hist[v]>Hist[v+1]
(2)(b) "Cliff" point check 60
if Hist[v]>Hist[v+1]+P1
(2)(c) "Fall" point check 60
if Hist[v]>Hist[v−1]+P1.

In the example implementation, P1 is set at the value 60 by way of example and not limitation.

Step (3)—Determination of Three Seeds 62. Then the desired number of seeds (e.g., three (3), by way of example and not limitation) are determined 62, such as according to the following example steps:

(3)(a) Find the largest candidate bin which fulfills the condition of v≧V1 where $$V1 = \frac{vm - v0}{3}.$$

If there are no qualified candidate bin with v≧V1, then the first seed bin is selected as $$V1 = \frac{vm - v0}{3}$$

as the first seed bin.

(3)(b) Find the largest candidate bin which fulfills the condition with V1<v≦V2 where $$V2 = 2 * \frac{vm - v0}{3}.$$

If there is no qualified candidate bin with v≦V2, select $$v = \frac{vm - v0}{2}$$

as the second seed bin.

(3)(c) Find the largest candidate bin which fulfills the condition V2<v. If there is no qualified candidate bin with v>V2, then select $$v = 5 * \frac{vm - v0}{6}$$

as the third seed bin.

After each seed is selected, its corresponding similarity threshold is calculated, such as in response to the following equations in which k is the index for the seed and can have a value in this specific implementation of 0, 1 and 2.

$$Tem = (|v - 16| \gg 2)$$
$$m[k] = \begin{cases} 1 & \text{if } Tem < 1 \\ Tem & \text{Otherwise} \end{cases}$$

Upon obtaining the desired number of seeds, three (3) in this implementation given by way of example and not limitation, the geometric feature descriptor is extracted 64, such as according to a procedure described in the following sections.

2.2 Geometric Feature Descriptor Extraction.

FIG. 4 illustrates an example embodiment 70, with a flowchart of geometric feature descriptor extraction. A processor element is not shown in this figure for the sake of simplicity of illustration, although this and other flowcharts are preferably performed in response to programming executed on a processor as discussed for FIG. 1. Initially, it is assumed as per this example that three (3) seeds are determined 72 at the input. For each block, if it is similar to the seed, with its pseudo-color saturation value satisfying the following condition, it is attributed to the same category as the seed. For each seed, the total number of blocks that are in the same category are counted in the whole image and the corresponding location centroid is determined 74 (e.g., calculated).

$$Saturation_{pseudo-color} - Seed[k]| \leq m[k]$$

Let L denote the total number of blocks in the same category as the seed, the location centroid of the same category blocks is determined (e.g., calculated) such as by the following relations, wherein location values are determined by calculating the mean value of both the horizontal and vertical locations.

$$Centroid_{Horizontal}[k] = \frac{1}{L} \sum_{BK(i,j) \in seed[k]} j$$

$$Centroid_{Vertical}[k] = \frac{1}{L} \sum_{BK(i,j) \in seed[k]} i$$

After the desired number of location centroids are obtained, a geometric figure is built 76 based on them. For example in the present example implementation, three (3) centroids, by way of example and not limitation, are obtained and a triangle built which is based on them. Let C0 denote the location centroid for Seed[0], whereby C1 denotes the location centroid for Seed[1] and C2 denotes the location centroid for Seed[2]. The following illustrates these geometric figures before continuing the description of FIG. 4.

FIG. 5 depicts a centroid triangle with vertices C0, C1 and C2, which results according to this element of the present invention.

The shape descriptor of this triangle can be used as the geometric feature of the image. In one example implementation, the shape descriptor can be three (3) angles of the triangle. Let A[0] denote the angle located in point C0, it can be calculated as follows:

$$A[0] = \tan^{-1}\left|\frac{Centroid_{Vertical}[1] - Centroid_{Vertical}[0]}{Centroid_{Horizontal}[1] - Centroid_{Horizontal}[0]}\right| - $$
$$\tan^{-1}\left|\frac{Centroid_{Vertical}[2] - Centroid_{Vertical}[0]}{Centroid_{Horizontal}[2] - Centroid_{Horizontal}[0]}\right|$$

Similarly, A[1] denotes the angle located in point C1, which can be calculated as follows:

$$A[1] = \pi - \tan^{-1}\left|\frac{Centroid_{Vertical}[1] - Centroid_{Vertical}[0]}{Centroid_{Horizontal}[1] - Centroid_{Horizontal}[0]}\right| - $$
$$\tan^{-1}\left|\frac{Centroid_{Vertical}[2] - Centroid_{Vertical}[0]}{Centroid_{Horizontal}[2] - Centroid_{Horizontal}[0]}\right|$$

Let A[2] denote the angle located in point C2, which can be determined as follows:

$$A[2] = \pi - A[0] - A[1].$$

2.3. Location Centroid Around Variance.

Returning to FIG. 4, it is seen that aside from the geometric triangle, a location centroid variance 78 can be applied for each seed, such as in which the horizontal and vertical location centroid around variance are determined as follows:

$$VAR_{hor}[k] = \frac{1}{L}\left(\sum_{BK(i,j) \in Seed[k]} (j - Centroid_{Horizontal})^2\right)$$

$$VAR_{ver}[k] = \frac{1}{L}\left(\sum_{BK(i,j) \in Seed[k]} (i - Centroid_{Vertical})^2\right)$$

The summation of the above centroid around a variance is then normalized by the image size, such as given by (M×N). After the normalized centroid around variance is obtained, then this value is also utilized as a portion of the geometric features.

$$VAR[k] = \frac{1}{MxN}(VAR_{ver}[k] + VAR_{hor}[k])$$

Finally, the color geometric feature descriptor can be described 80 by the following six (6) dimensional vector:

CFeature={A[0],VAR[0],A[1],VAR[1],A[2],VAR[2]}

Based on the inventive geometric feature descriptor, both rotation and scale invariant recognition can be provided.

FIG. 6 depicts a shrunken and rotated version of FIG. 5, showing locations C0', C1' and C2' which exemplify the rotation and scale invariant recognition of the invention. It will be appreciated that even with different scales and rotations, their geometric features are the same.

3. Geometric Feature Descriptor Based on Block Intensity.

In addition to color, another important feature that differentiates one image from another is the luminance intensity. A very bright or dark object more readily captures the attention of a human viewer. Based on this observation, a block intensity based geometric feature descriptor was developed in response to the block intensity map. This geometric feature descriptor can be used in combination with the histograms for image discernment.

The block intensity map consists of the mean luminance value of each block. In the example implementation, an 8×8 block Y mean is used as the block intensity value. After the image intensity map is extracted, each block intensity value is quantized by the following:

$(BK_{intensity}+8)>>4$

The histogram of the quantized intensity map is then calculated for intensity seed selection. The basic concept is to find the appropriate peak value in the histogram with some adjustment such that the most possible stand-out intensity values that belong to the object of interest can be extracted.

Figure 7:
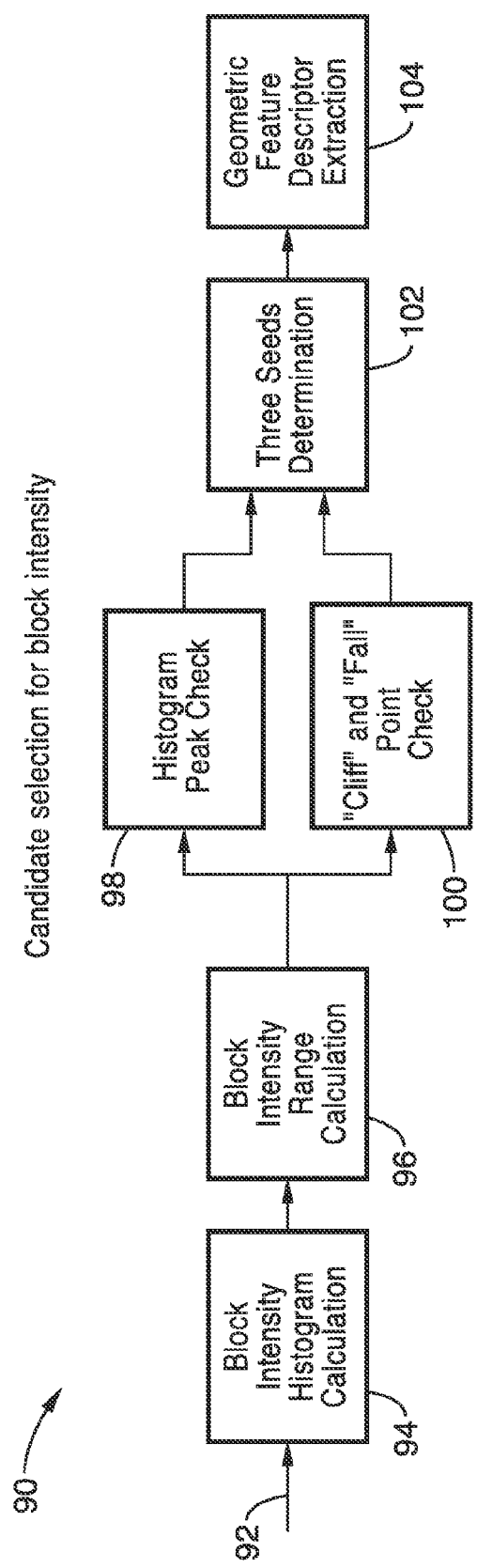
FIG. 7 is a flow diagram of candidate selection for block intensity according to an embodiment of the present invention.

FIG. 7 illustrates an example embodiment of the seed selection process 90. A processor element is not shown in this figure for the sake of simplicity of illustration, although this and other flowcharts are preferably performed in response to programming executed on a processor as discussed for FIG. 1. Block information 92 is received and a quantized block intensity value is determined 94, followed by making a block intensity range calculation 96, performing peak, cliff and fall checks 98, 100, determining a given number of seeds 102, and geometric feature extraction 104. The following section describes portions of the above in greater detail.

Let Hist[u] denote the histogram value of the quantized intensity value v, the seeds selection process is performed by the following. In the block intensity range determination 96, the block intensity lower bound is found by searching the minimum block intensity value "u0" with Hist[u0] greater than a threshold P and the block intensity upper bound is found by searching maximum block intensity value "um" with Hist[um] greater than a threshold P, wherein P is an image size dependent parameter which, for example, is six (6) in the implementation described.

After the color saturation range is determined, the histogram bins that exceed a small value K (e.g., sixteen (16) in the example implementation described) are checked within the range, with the following criteria being used according to one implementation to find all the candidate histogram bins as potential seeds:

(a) Histogram Peak check 98:
If Hist[u]>Hist[u+1] and Hist[u]>Hist[u−1];
(b) "Cliff" point check 100: If Hist[u]>Hist[u+1]+P2;
(c) "Fall" point check 100: If Hist[u]>Hist[u−1]+P2;

where P2 according to one implementation example is the value 120.

Then three (3) seeds are determined 102, such as in response to the following steps:

Step (1)—Find the largest candidate bin with u≦U1 where $$U1 = \frac{(um - u0)}{3}.$$

If there is no qualified candidate bin with u≦U1, then $$u = \frac{(um - u0)}{6}$$

is selected as the first seed bin.

Step (2)—Find the largest candidate bin with U1<u and u≦U2 where $$U2 = 2 * \frac{(um - u0)}{3}.$$

If there is no qualified candidate bin with u≦U2, then $$u = \frac{(um - u0)}{2}$$

is selected as the second seed bin.

Step (3)—Find the largest candidate bin with U2<u. If there is no qualified candidate bin with u>U2, then $$u = 5 * \frac{(um - u0)}{6}$$

is selected as the third seed bin.

Step (4)—After each seed is selected, its corresponding similarity threshold is calculated by the following equations, in which k is the index for the seed, which according to the example implementation can be 0, 1 and 2.

$$Tem = |v - 8|$$
$$m1[k] = \begin{cases} 2 & \text{if } Tem < 2 \\ 3 & \text{Otherwise} \end{cases}$$

After the three (3) seeds are selected 102, the same procedure as previously described can be utilized to calculate a multi-dimensional (e.g., six (6) dimensional) vector IFeature for representing the intensity geometric feature.

4. Geometric Feature Descriptor Based Image Matching.

After the color geometric feature descriptor and intensity geometric feature descriptor are obtained, the following equation can be utilized for determining image distance:

$$Dis(\text{Image}_{current}, \text{Image}_{template}) = D(CFeature_{current}, CFeature_{template}) + W \times D(IFeature_{current}, IFeature_{template})$$

where the color geometric feature descriptor (CFeature) and intensity geometric feature descriptor (IFeature)) distance can utilize any vector distance measure to calculate, while W is a constant parameter which is given by 0.1 in one example implementation. In the example implementation, a simplified Chi square is used as follows to calculate the vector distance:

$$D(\text{Feature}_{current}, \text{Feature}_{template}) = \sum_k \frac{|A_{current}[k] - A_{template}[k]|}{A_{current}[k] + A_{template}[k]} + \frac{|VAR_{current}[k] - VAR_{template}[k]|}{VAR_{current}[k] + VAR_{template}[k]}$$

In the above description, the geometric feature descriptors are presented based on a combination of pseudo-color saturation map and block intensity map. It should be appreciated that these teachings can be applied to generate geometric feature descriptors in other feature domains, such as 3D color histogram, edge maps and so forth without departing from the teachings of the present invention. Although the current descriptor is a triangle based 6D vector, it should be appreciated that multiple seeds can be selected to form a polygon and the image matching can be performed by polygon shape matching correspondingly, or without limitation to other geometric shapes.

From the description herein, it will be appreciated that the present invention provides methods and apparatus for describing images and providing fast image retrieval thereof. Inventive teachings can be applied in a variety of apparatus and applications, including image searching applications on local or networked databases, image storage applications, image sharing websites, cameras, and so forth which apply to both still images and video frames.

As can be seen, therefore, the present invention includes the following inventive embodiments among others:

1. An apparatus for image retrieval, comprising: a computer configured for processing images; a memory coupled to said computer; and programming configured for retention on said memory and executable on said computer for performing steps comprising: maintaining a repository of images in an image repository; determining a color feature as a pseudo-color saturation for an input image; generating a histogram of said pseudo-color saturation; comparing said histogram of pseudo-color saturation for said input image to a histogram of pseudo-color saturation for an image within said repository of images; and retrieving images from said repository of images in response to said comparing.

2. The apparatus of embodiment 1, wherein said programming performs operations further comprising comparing a geometric feature description of said pseudo-color saturation.

3. The apparatus of embodiment 2, wherein said geometric feature description of said pseudo-color saturation and block intensity is calculated for a given block size by said programming by: determining seed values from within said histogram of pseudo-color saturation and determining a similarity threshold for each seed; determining a location centroid of the blocks in the same category as the seed; and building a geometric figure from the location centroids for each seed as a geometric feature description of said pseudo-color saturation.

4. The apparatus of embodiment 3, wherein said seed values within said histogram of pseudo-color saturation comprise peak, cliff, and fall points.

5. The apparatus of embodiment 1, wherein said programming performs operations further comprising differentiating between images in response to: determining an intensity feature as a block intensity for an input image; generating a histogram of said block intensity; and comparing a block intensity map of said input image with a template.

6. The apparatus of embodiment 1, wherein said programming performs operations further comprising low pass filtering of an image prior to said generating of a histogram of pseudo-color saturation.

7. The apparatus of embodiment 1, wherein said programming performs operations further comprising scaling of an image to a lower resolution prior to said generating of a histogram of pseudo-color saturation.

8. The apparatus of embodiment 1, wherein said histogram of said pseudo-color saturation is contained within an image descriptor.

9. The apparatus of embodiment 1, wherein said image retrieval is performed for arbitrary images in which no information is needed in describing the subject matter of said image.

10. The apparatus of embodiment 1, wherein said image is selected from the group of images consisting of still images, graphics, and frames of video.

11. The apparatus of embodiment 1, wherein said image retrieval is not adversely impacted by image scaling or rotation.

12. The apparatus of embodiment 1, wherein said image retrieval apparatus can be selected for retrieving matching images, non-matching images, or images having any desired relationship to one another.

13. An apparatus for image retrieval, comprising: a computer configured for processing images; a memory coupled to said computer; and programming configured for retention on said memory and executable on said computer for performing operations comprising: maintaining a repository of images in an image repository; determining a color feature as a pseudo-color saturation for an input image; determining an intensity feature as a block intensity for an input image; generating a histogram of said pseudo-color saturation; generating a histogram of said block intensity; determining seed values from within said histogram of pseudo-color saturation and determining a similarity threshold for each seed; determining seed values from within said histogram of block intensity and determining a similarity threshold for each seed; determining a location centroid of the blocks in the same category as the seed; building a geometric feature description from the location centroids for each seed as a geometric feature of said pseudo-color saturation; building a geometric feature description from the location centroids for each seed as a geometric feature of said block intensity; comparing said feature description for said input image to a feature description from the centroids for each seed for an image within said repository of images; and retrieving images from said repository of images in response to said comparing.

14. The apparatus of embodiment 13, wherein said programming performs operations further comprising differentiating between images in response to: determining an intensity feature as a block intensity for an input image; generating a histogram of said block intensity; determining seed values from within said histogram of block intensity and determining a similarity threshold for each seed; determining a location centroid for block intensity in the same category as the seed; and building a geometric feature description from the location centroids for each seed as a geometric feature of said block intensity.

15. The apparatus of embodiment 13, wherein said programming performs operations further comprising comparing said histogram of pseudo-color saturation prior to calculating said geometric feature description.

16. The apparatus of embodiment 15, wherein said programming performs operations further comprising eliminating certain of said input images from said calculating of said geometric feature description in response to said comparing said histogram of pseudo-color saturation.

17. The apparatus of embodiment 13, wherein said seed values within said histogram of pseudo-color saturation comprise peak, cliff, and fall points.

18. The apparatus of embodiment 13, wherein said programming performs operations further comprising determining a normalized location centroid variance for each said seed, comparing said histogram of pseudo-color saturation prior to calculating said geometric feature description.

19. The apparatus of embodiment 18, wherein said programming performs operations further comprising using said location centroids and said normalized location centroid variance for each said seed within a multidimensional feature descriptor.

20. A method of retrieving images in response to a comparison, comprising the steps of: maintaining a repository of images in an image repository; determining, within a computer, a color feature as a pseudo-color saturation for an input image; determining an intensity feature as a block intensity for an input image; generating a histogram of said pseudo-color saturation; generating a histogram of said block intensity; determining seed values from within said histogram of pseudo-color saturation and determining a similarity threshold for each seed; determining seed values from within said histogram of block intensity and determining a similarity threshold for each seed; determining a location centroid and normalized centroid variance for each seed; building a geometric feature description from the location centroids and normalized centroid variance for each seed as a geometric feature description of said pseudo-color saturation; building a geometric feature description from the location centroids and normalized centroid variance for each seed as a geometric feature description of said block intensity; comparing said geometric feature description for said input image with a geometric feature description from the location centroids for each seed for a comparison image within said repository of images; comparing block intensity map of said input image with a template; and retrieving images from said repository of images in response to said comparing.

Embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation (s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation (s), algorithm(s), and/or block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:
1. An apparatus for image retrieval, comprising:
a computer configured for processing images;
a memory coupled to said computer; and
programming configured for retention in said memory and executable on said computer for performing operations comprising:
 maintaining a repository of images in an image repository;
 determining a one dimensional color feature as a pseudo-color saturation, or block intensity, or a combination of pseudo-color saturation and block intensity, for an input image;
 generating a histogram of said pseudo-color saturation, or block intensity, or a combination of pseudo-color saturation and block intensity;

determining multiple seed values from within said histogram of pseudo-color saturation, or block intensity, or a combination of pseudo-color saturation and block intensity, in response to: (a) finding a range between minimum and maximum values of color saturation, or block intensity, or a combination of pseudo-color saturation and block intensity, within the histogram based on an image size dependent threshold, (b) finding pseudo histogram peaks, cliffs and falls within said histogram as candidate seeds; (c) determining a predetermined number of seeds based on finding largest candidate seeds which exceed a predetermined fraction of difference between minimum and maximum values of color saturation, or block intensity, or a combination of pseudo-color saturation and block intensity;

determining a similarity threshold for each seed;

determining a location centroid of blocks in a same category of value as each seed;

building a geometric figure from location centroids for each seed as a geometric feature description of said pseudo-color saturation, or block intensity, or a combination of pseudo-color saturation and block intensity;

comparing a geometric feature description of said pseudo-color saturation, or block intensity, or a combination of pseudo-color saturation and block intensity; and retrieving images from said repository of images in response to said comparing.

2. The apparatus as recited in claim 1, wherein said programming performs operations further comprising low pass filtering of an image prior to said generating of a histogram of pseudo-color saturation.

3. The apparatus as recited in claim 1, wherein said programming performs operations further comprising scaling of an image to a lower resolution prior to said generating of a histogram of pseudo-color saturation.

4. The apparatus as recited in claim 1, wherein said histogram of said pseudo-color saturation is contained within an image descriptor.

5. The apparatus as recited in claim 1, wherein said image retrieval is performed for arbitrary images in which no information is needed in describing the subject matter of said image.

6. The apparatus as recited in claim 1, wherein said image is selected from the group of images consisting of still images, graphics, and frames of video.

7. The apparatus as recited in claim 1, wherein said image retrieval is not adversely impacted by image scaling or rotation.

8. The apparatus as recited in claim 1, wherein said image retrieval apparatus can be selected for retrieving matching images, non-matching images, or images having any desired relationship to one another.

9. An apparatus for image retrieval, comprising:
a computer configured for processing images;
a memory coupled to said computer; and
programming configured for retention on said memory and executable on said computer for performing operations comprising:
maintaining a repository of images in an image repository;
determining, for an input image having a number of blocks, a one dimensional color feature as pseudo-color saturation, or an intensity feature as block intensity, or a combination of a color feature as pseudo-color saturation and an intensity feature as block intensity;
generating a histogram of said pseudo-color saturation, or block intensity, or a combination of pseudo-color saturation and block intensity;
determining multiple seed values from within said histogram of pseudo-color saturation, or block intensity, or a combination of pseudo-color saturation block intensity, in response to: (a) finding a range between minimum and maximum color saturation values, or block intensity, or a combination of color saturation values and block intensity, within the histogram based on an image size dependent threshold, (b) finding pseudo histogram peaks, cliffs and falls within said histogram as candidate seeds; (c) determining a predetermined number of seeds based on finding largest candidate seeds which exceed a predetermined fraction of difference between minimum and maximum values of color saturation, or block intensity, or a combination of color saturation values and block intensity;
determining a similarity threshold for each seed;
determining a location centroid of blocks in a same category as each seed;
building a geometric figure from location centroids for each seed as a geometric feature description of said pseudo-color saturation, or block intensity, or a combination of color saturation values and block intensity;
comparing said feature description for said input image to a feature description from the location centroids for each seed for an image within said repository of images; and
retrieving images from said repository of images in response to said comparing.

10. The apparatus as recited in claim 9, wherein said programming performs operations further comprising comparing said histogram of pseudo-color saturation prior to calculating said geometric feature description.

11. The apparatus as recited in claim 10, wherein said programming performs operations further comprising eliminating certain of said input images from said calculating of said geometric feature description in response to said comparing said histogram of pseudo-color saturation.

12. The apparatus as recited in claim 9, wherein said programming performs operations further comprising determining a normalized location centroid variance for each said seed, comparing said histogram of pseudo-color saturation prior to calculating said geometric feature description.

13. The apparatus as recited in claim 12, wherein said programming performs operations further comprising using said location centroids and said normalized location centroid variance for each said seed within a multidimensional feature descriptor.

14. A method of retrieving images in response to a comparison, the method comprising:
maintaining a repository of images in an image repository;
determining for an input image, within a computer, a one dimensional color feature as a pseudo-color saturation, or an intensity feature as a block intensity, or a combination of a pseudo-color saturation and an intensity feature as a block intensity;
generating a histogram of said pseudo-color saturation, and/or said block intensity;
determining multiple seed values from within said histogram of pseudo-color saturation, or block intensity, or a combination of a pseudo-color saturation and block intensity by: (a) finding a range between minimum and maximum values of pseudo-color saturation, or block intensity, or a combination of a pseudo-color saturation and block intensity, within the histogram based on an image size dependent threshold, (b) finding pseudo histogram peaks, cliffs and falls within said histogram as candidate seeds; (c) determining a predetermined number of seeds based on finding largest candidate seeds which exceed a predetermined fraction of difference between minimum and maximum values of said pseudo-color saturation, or said block intensity, or a combination of said pseudo-color saturation and said block intensity;

determining a similarity threshold for each seed;

determining a location centroid and normalized centroid variance for each seed;

building a geometric feature description from the location centroids and normalized centroid variance for each seed as a geometric feature description of said pseudo-color saturation, or said block intensity, or a combination of said pseudo-color saturation and said block intensity;

comparing said geometric feature description for said input image with a geometric feature description from the location centroids for each seed for a comparison image within said repository of images;

retrieving images from said repository of images in response to said comparing.

* * * * *